United States Patent [19]
Nakayama et al.

[11] Patent Number: 5,323,567
[45] Date of Patent: Jun. 28, 1994

[54] PLANT CULTIVATING APPARATUS

[75] Inventors: Shigeki Nakayama; Akira Ikeda; Yoshitaka Kawaai; Kenji Ezaki, all; Yasuko Taniguchi, all of Hyogo; Yoshinori Hattori, Tokyo; Kazumasa Watanabe; Tomomi Zaitsu, both of Osaka; Kazuyoshi Yabuuchi, Hyogo, all of Japan

[73] Assignee: Mitsubishi Denki Kabushiki Kaisha, Tokyo, Japan

[21] Appl. No.: 77,610

[22] Filed: Jun. 17, 1993

Related U.S. Application Data

[60] Division of Ser. No. 67,175, May 26, 1993, abandoned, which is a continuation of Ser. No. 768,111, Sep. 30, 1991, which is a continuation of Ser. No. 823,350, Jan. 28, 1986, abandoned.

[30] Foreign Application Priority Data

| Jan. 31, 1985 | [JP] | Japan | 60-15431 |
| Sep. 4, 1985 | [JP] | Japan | 60-193854 |
| Sep. 4, 1985 | [JP] | Japan | 60-193855 |
| Sep. 4, 1985 | [JP] | Japan | 60-193856 |
| Sep. 4, 1985 | [JP] | Japan | 60-193857 |
| Sep. 4, 1985 | [JP] | Japan | 60-193858 |
| Nov. 25, 1985 | [JP] | Japan | 60-264535 |
| Nov. 25, 1985 | [JP] | Japan | 60-264536 |

[51] Int. Cl.$^5$ ............................................. A01G 31/02
[52] U.S. Cl. ......................................... 47/65; 47/63
[58] Field of Search ................... 47/65, 65 D, 17 MS, 47/62, 63

[56] References Cited

U.S. PATENT DOCUMENTS

| 3,988,858 | 11/1976 | Bomba | 47/58 |
| 4,028,847 | 6/1977 | Davis | 47/65 |
| 4,068,405 | 1/1978 | Campbell | 47/65 |
| 4,216,618 | 8/1980 | Haub | 47/65 |
| 4,543,744 | 10/1985 | Rayster | 47/60 |
| 4,569,714 | 2/1986 | Molnar | 47/DIG. 3 |
| 4,617,755 | 10/1986 | Ikeda | 47/65 |
| 4,932,158 | 8/1990 | Roberts | 47/65 |

FOREIGN PATENT DOCUMENTS

| 8502774 | 10/1985 | Netherlands | 47/65 D |
| 001888 | 6/1983 | World Int. Prop. O. | 47/65 |
| 000039 | 9/1985 | World Int. Prop. O. | 47/65 |

*Primary Examiner*—Henry E. Raduazo
*Attorney, Agent, or Firm*—Leydig Voit & Mayer

[57] ABSTRACT

In a plant cultivating apparatus for cultivating plants by using an artificial light source, partition walls having a high light reflectance are arranged in a cultivation area to divide the cultivation area into small spaces and in each small space a light-reflecting plate is arranged, and the distance between an artificial light source and a plant is narrowed to irradiate the plant with a light having a low illuminance. In accordance with a preferred embodiment, there is provided a plant cultivating apparatus comprising sets of pallets which have plants placed therein and are arranged in rows in a growing chamber where environmental conditions which are artificially controlled and which are moved in a direction radial to the row direction in accordance with the growth of plants, wherein all the peripheral surface of the growing chamber are covered with a reflecting plate having a high light reflectance. Low-illuminance artificial light sources for emitting a light of a low illuminance are arranged so that the distance between the light sources and plants are small, and the spaces between the rows of pallets are 1.1 to 1.5 times the spaces between plants provided when plants are closely set to such an extent that adjacent plants do not overlap each other.

4 Claims, 14 Drawing Sheets

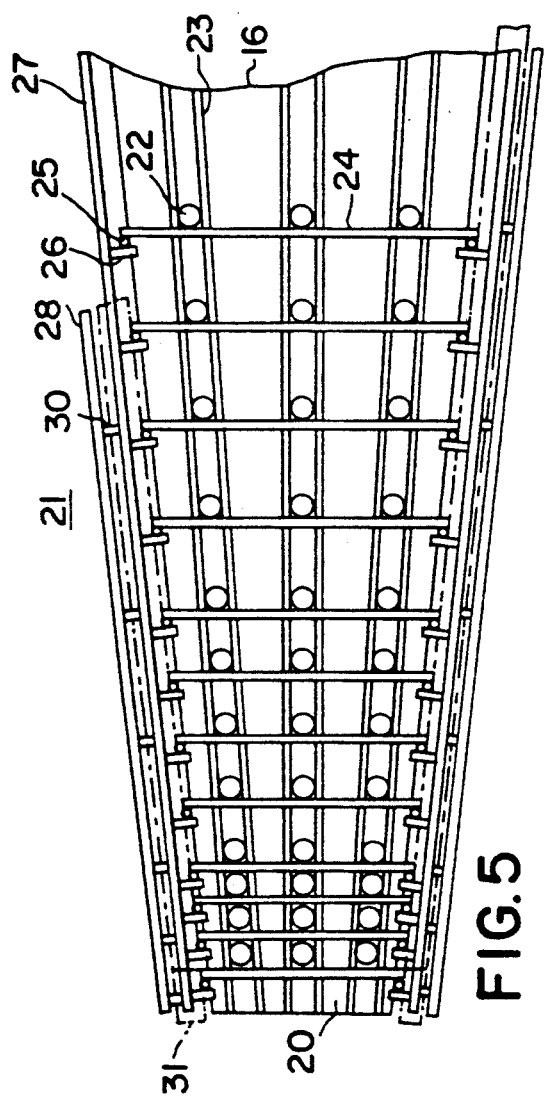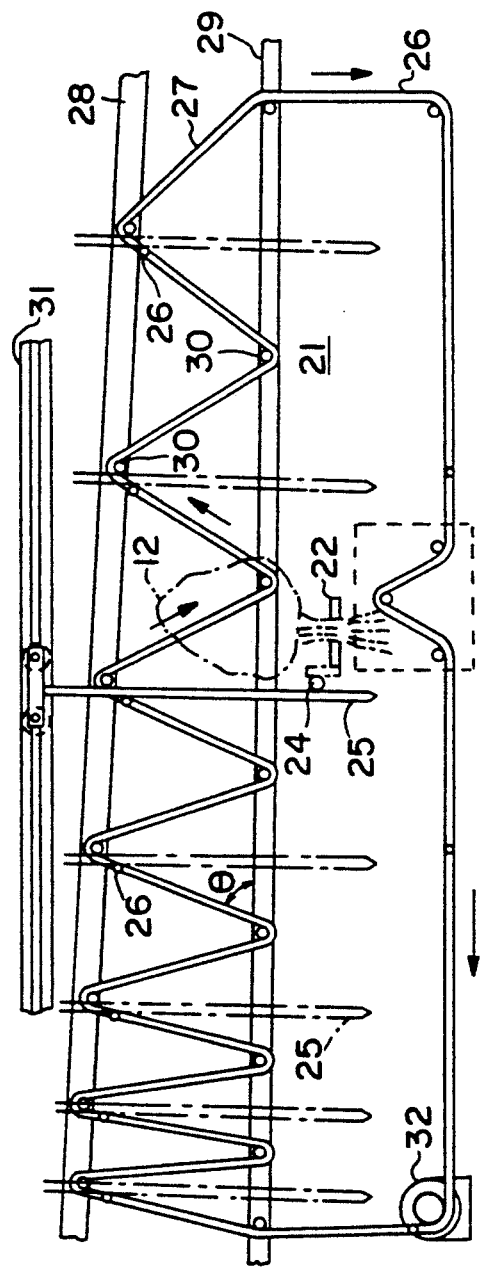

PLANT CULTIVATING APPARATUS

This application is a divisional of application Ser. No. 08/067,175, filed May 26, 1993, now abandoned, which is a continuation of Ser. No. 07/768,111, filed Sep. 30, 1991, which is a continuation of application Ser. No. 06/823,350, filed Jan. 28, 1986, now abandoned.

BACKGROUND OF THE INVENTION

The present invention relates to a plant cultivating apparatus. More particularly, the present invention relates to a plant cultivating apparatus in which cultivating conditions are artificially controlled.

As is well known, the growth of plants depends greatly on the environment. However, the natural environment on the earth varies and it is not always suitable for the growth of plants. The season when the natural environment has conditions suitable for the growth of plants is not present in some areas or is very short in other areas. Accordingly, conventionally, cultivation has been performed in facilities for artificially controlling environmental factors causing reduction of the productivity of plants to engender plant productivity at a level as high as possible. In these cultivation facilities, however, influences of the natural environment are not completely eliminated and, therefore, increase of plant productivity is limited.

Accordingly, attempts have been made to foster maximum plant growth in an artificial environment. Namely, plant factories have been constructed. In a plant factory, a plant is cultivated in an environment which can be optionally controlled, and completely controlled cultivation is possible. Accordingly, such a plant factory has many merits. However, in the above-described plant factory, since the environment is artificially prepared, the cost is increased because of consumption of energy. Accordingly, in order to make such artificial cultivation practical while utilizing the merits of such a plant factory, it is necessary to produce an energy saving effect and increase the productivity of the land used. Moreover, it is important to provide high-grade plants which are uniform in quality.

Plant cultivation in such a plant factory is carried out under artificial illumination in a building in which such conditions as temperature, humidity, carbon dioxide gas concentration and air speed are controlled. The property required for a light source suitable for this artificial illumination is that light having the necessary wavelength for the growth of plants be emitted at a predetermined intensity at high efficiency. The predetermined intensity referred to herein differs according to the kinds of plants that are to be grown. If this intensity is expressed in terms of illuminance, about 20 Klx is necessary for a weak-light plant and it is difficult to satisfy this requirement by using a single light source. Light sources having high luminous intensity and efficiency, such as high-pressure sodium lamps, mercury lamps, or metal halide lamps are used as the main light source in combination with fluorescent lamps to cover the wavelength.

When employing a central light source such as a high-pressure sodium lamp, the lamp should be disposed at a considerably higher position then the fluorescent lamps because the luminous intensity of one sodium lamp is very high. Otherwise, the plants cannot be irradiated at a uniform illuminance.

For example, in the case of lettuce, when cultivation is carried out at an illuminance of 18 to 20 Klx, if other environmental conditions are suitable, weight is increased 10 times in 7 to 8 days, and high-speed cultivation is possible.

As a means for reducing the power required for this artificial illumination, a method has been proposed in which a plant is irradiated at a low illuminance of about 5 Klx uniformly from all directions. According to this method, in the case of lettuce, the illumination power necessary for production of 100 g is only 0.65 KWH if an extremely high-efficiency fluorescent lamp is used. In a plant cultivated in such a way, the water content is about 95%, and the contents if inorganic substances (mineral) and vitamin C are as high as 30 mg/100 g. However, the method is defective in that the leaf shape of the plant is excessively long.

In the case where plants are cultivated with predetermined spaces provided between adjacent plants in a conventional plant factory as described above, even areas not requiring irradiation are illuminated, and therefore, an excess number of illuminating devices must be provided, requiring more equipment, land and building space. Accordingly, land utilization efficiency is low, and the cost of air-conditioning and other equipment and maintenance costs thereof are increased, having a great effect on production costs.

A means for obviating this disadvantage is provided in Japanese Patent Application Laid-Open Specification No. 55-24000. There a plant cultivating apparatus in which a plurality of pallets having plants placed therein are arranged in rows and a plurality of sets of pallets are arranged in a direction orthogonal to said rows. The space between adjacent pallets is increased in accordance with plant growth and the pallets are moved in a direction orthogonal to the row direction and fed to a harvesting line.

In such a plant cultivating apparatus, the speed of the movement of the pallets in the advance direction is changed in accordance with the growth of the plants to increase the space between the plants in the direction orthogonal to the row direction to provide an optimum space, whereby the amount of effective irradiation light is minimized by effective irradiation and the area occupied by cultivating facilities can be reduced.

In a conventional plant factory, because of the above-mentioned structure, since the luminous intensity per lamp is high when high-pressure sodium lamps or the like are used as the main light source, the lamps should be separated from the plants. Otherwise, the plant is not uniformly irradiated with light and the leaf temperature of the plant is excessively elevated injuring growth.

However, if the distance between the plants and the lamps is increased, the capacity of the building has to be increased, resulting in an increase in construction costs. Moreover, since the light should be dispersed, the efficiency of utilization of the light is inevitably reduced. Further, the quantity of air circulated in the building is increased and, consequently, air-conditioning costs are increased. On the other hand, in the case where a fluorescent lamp having good wavelength characteristics is used, since the fluorescence intensity is low, in order to obtain an illuminance of about 20 Klx, it is necessary to arrange many fluorescent lamps together without any substantial space between adjacent lamps.

Even at a low illuminance below 20, Klx, for example, at an illuminance of about 5 Klx, if plants are uniformly irradiated and cultivation conditions, such as carbon dioxide gas concentration and temperature, are maintained at appropriate levels, the plants can be grown at a high speed. Accordingly, in order to solve the above-mentioned problem in the use of fluorescent lamps, there may by be adopted a method in which the inner surface of a growing chamber is constructed with a reflecting plate having high light reflectance and the distance between the fluorescent lamp and the plant is shortened, whereby light of low illuminance is applied by using a small number of fluorescent lamps. In this method, however, if plants are cultivated close together so as to reduce the cultivated area and enhance land utilization, growth speed is reduced at such low illuminance as 5 Klx, and when the size of the plant leaves increases adjacent plants overlap each other. Consequently, the method is defective in that uniformly high-quality plants cannot be obtained.

As is apparent from the foregoing description, a low-illuminance, omni-directional irradiation plant cultivating system is promising as a power-saving technique, but in the cultivation of plants, where commercial value is influenced by the leaf shape, such as with lettuce, this system is not preferred from the view point of the product price because leaves grow excessively thus degrading the commercial value. Furthermore, if plants grow too long, the area occupied by plants in the plant cultivating bed is increased and, therefore, the equipment and illumination power costs are increased and cultivation becomes economically disadvantageous.

The above-mentioned conventional plant cultivating apparatus is constructed so that plants are supported by plate-like plant supports. However, as the plant grows, adjacent plants become too close to each other and the plant supports are covered with leaves of plants, while the plants grow leaning on plant supports. Accordingly, with an increase of the cultivation area, leaf portions of the plants fall down and the shape becomes bad. If the plants are uniformly irradiated with light, high-speed cultivation is possible even at a low illuminance. However, if the plants grow while leaning on the surface of the plant supports, reflection of light of the fluorescent lamp on the surface of the plant support is attenuated as the plants grow, with the results that uniform irradiation becomes impossible and reduction of the efficiency in photosynthesis of the plants is caused.

As pointed out hereinbefore, in the conventional plant cultivating apparatus, spaces between plants are increased only in a direction orthogonal to the row direction; but in the row direction, spaces corresponding to the size of fully grown plants are provided and these spaces are maintained throughout the cultivation period from the small seedlings stage to the mature plant stage. Accordingly, in the small seedlings stage the spaces are superfluous and the apparatus is defective in that effective utilization of the emitted light and floor surface cannot be attained.

As a means for overcoming this disadvantage, to broaden the spaces between pallets having plants placed therein in the row direction, troughs for guiding the pallets are radially formed and the respective pallets in the row direction are pushed out in the advance direction by a push-out rod. The push-out rod should cover the entire width when the spaces between the plants in the row direction become largest in the last stages where the plants are most mature. Accordingly, in the stages where the plants have not grown, the push-out rod is unnecessary. However, the length of the push-out rod cannot be reduced. Therefore, the total range covered by the push-out rod corresponds to the surface occupied by the plant cultivating apparatus and the method is defective in that the efficiency of utilization of the area of the land is very low. Consequently, this method is not suitable for practical application.

In conventional pallets having the above-mentioned structure, thinning operations have to be manually performed according to the growth of plants, and such pallets have unnecessary parts which contact the floor surface, increasing friction, with the result that excessive force is necessary for the moving device.

If the environmental conditions including light, are appropriately controlled, plants grow at high speeds with good reproducibility. A great deal of the problems involved in conventional plant cultivation techniques are economic problems, and, at present, the cost of the electric power for the light source for irradiating plants with artificial light is about 40% of the total manufacturing cost. In view of the manufacturing cost, this light source power cost is a heavy burden.

SUMMARY OF THE INVENTION

The present invention is designed to solve the foregoing problems involved in the conventional techniques. Therefore, a primary object of the present invention is to provide a plant cultivating apparatus in which consumption of the electric power for illumination is reduced and the structure is simplified and made compact.

Another object of the present invention is to provide a plant cultivating apparatus in which uniformly high-quality plants can be obtained by low-illuminance irradiation without increasing the cultivation area.

Still another object of the present invention is to provide a plant cultivating apparatus which comprises an artificial illumination device using an artificial light source having high illumination efficiency in which the productivity per unit area of land can be increased.

Still another object of the present invention is to solve the problem involved in conventional low-illuminance, omni-directional irradiating systems and provide a plant cultivating apparatus in which power consumption is reduced, excessive growth of plants is prevented and high-grade plants can be advantageously cultivated economically.

Yet another object of the present invention is to provide a plant cultivating apparatus in which the shape of plants can be regulated to improve the quality of products and which is constructed so that photosynthesis is not inhibited by reflected light.

Yet another object of the present invention is to provide a planting tool in a plant cultivating apparatus in which broadening of spaces with growth of plants is facilitated, the force of driving a moving device is reduced and the movement can be performed smoothly.

Yet another object of the present invention is to provide a plant cultivating apparatus in which a superfluous space is not necessary and the floor area can be effectively utilized.

A further object of the present invention is to provide a plant cultivating apparatus in which the irradiating power consumption can be reduced.

In accordance with one fundamental aspect of the present invention, there is provided a plant cultivating apparatus comprising an artificial illumination device using an artificial light source and having a high illumination efficiency in which the ceiling surface and the total peripheral wall surface of a growing chamber are constructed of a reflecting plate having a high light reflectance. A ceiling panel is provided with low-illuminance artificial light sources which are inclined so that the height of the ceiling panel is small in the area where plants are small. The distance between the low-illuminance artificial light sources and the plants is reduced during the growth of the plants in order to increase the land utilization efficiency. A hydroponic solution tank is disposed in the growing chamber having a bottom plate inclined so that the liquid depth is shallow in an area where plants are small and a plurality of such growing chambers having a small height in an area where plants are small and a large height in an area where plants are large are piled so that the moving directions of sets of pallets are alternately opposite to one another.

In the apparatus of the present invention having the above-mentioned structure, by positioning a ceiling panel provided with low-illuminance artificial light sources at an incline, the artificial light sources are always brought close to the plants during the growth thereof and are confined in narrow spaces. Therefore, plants can be sufficiently cultivated even by a small number of low-illuminance artificial light sources. Furthermore, by using the inclined bottom of the hydroponic solution tank as the ceiling panel of the chamber lying directly thereunder, the entire height is decreased and the structure is made three-dimensionally compact increasing the land utilization efficiency.

In accordance with still another aspect of the present invention, there is provided a plant cultivating apparatus in which artificial light is directed to plants while they are moved in accordance with their growth. The apparatus is controlled so that irradiation with a strong light and irradiation with a weak light are alternately repeated in the moving direction of the plants according to the stage of cultivation.

In the apparatus of the present invention having the above-mentioned structure, light irradiation during cultivation is omni-directional and low-illuminance irradiation reducing the power consumption and increasing the power utilization efficiency and high-illuminance irradiation regulating the shape of plants, are alternately carried out. is provide for moving the respective pallets while gradually expanding spaces between adjacent pallets.

In the plant cultivating apparatus of the present invention having the above-mentioned structure, the spaces between pallets are narrow on the stage where plants are still relatively ungrown and since the push-out member for advancing the pallets is flexible, it is wound on the winding device. When the pallets are moved in the advance direction according to the growth of the plants while broadening the spaces between pallets along the troughs, the push-out member is fed out only in sufficient length to push out the pallets, and, therefore, superfluous space is not necessary.

The growth characteristics of plants under certain conditions were examined with a view to solving the foregoing problems involved in the conventional techniques. Namely, the inner surface of a cultivating chamber was covered with material having a high visible light reflectance and the growth characteristics of plants were examined where the volume of the inner space of the cultivating chamber was smallest.

As a result, the following three facts were found. First, it was found that if appropriate environmental conditions are maintained, the growth rate of plants, for example, the rate of increase of the weight of living plants, is expressed by a formula of $dW/dt = kW$ in which W stands for the weight of living plants. Secondly, it was found that when plants are cultivated at certain setting spaces using a light source having a certain emission quantity, the growth rate constant k is reduced corresponding to the growth. In other words, the growth rate constant k depends on the ratio of the area occupied by plants to the area of the cultivating bed. Thirdly, it was found that if this ratio of the <ares occupied by plants is reduced below a certain limit, the dependency of the growth rate constant k on this occupied area is lost.

When plants are cultivated by using an artificial light source, in order to effectively utilize the light, the area of the cultivating bed should be minimum which still allows the plants to be sufficiently irradiated with the light. However, since the area occupied by plants changes according to the growth of plants, it is difficult to maintain appropriate spaces throughout the cultivation period, and loss of light cannot be avoided.

If cultivation is carried out in a state where light sources and plants are confined in a relatively narrow space, plants are irradiated with directionally uniform light by the light-reflecting effect of the wall surface or the like, imparting good effects on growth of plants. Therefore, spatial illuminance distribution is important.

The present invention has been completed based on these findings in light of the above-mentioned problems. More specifically, in accordance with yet another aspect of the present invention, there is provided a plant cultivating apparatus in which the spacial illuminance distribution is measured in a cultivating chamber, in which intrusion of light from the outside is prevented by using an illuminance sensor. The luminous intensity of a luminous intensity-controllable light source is controlled based on the value measured by the illuminance sensor through a device for processing the value measured by the illuminance meter so that the measured value is adjusted to a predetermined value optimal for the growth of plants.

BRIEF DESCRIPTION OF THE DRAWINGS

FIG. 5 is a plan view showing an example of the moving device in the apparatus shown in FIG. 3, FIG. 6 is a side view of the moving device shown in FIG. 5.

DETAILED DESCRIPTION OF THE PREFERRED EMBODIMENTS

Figure 1:
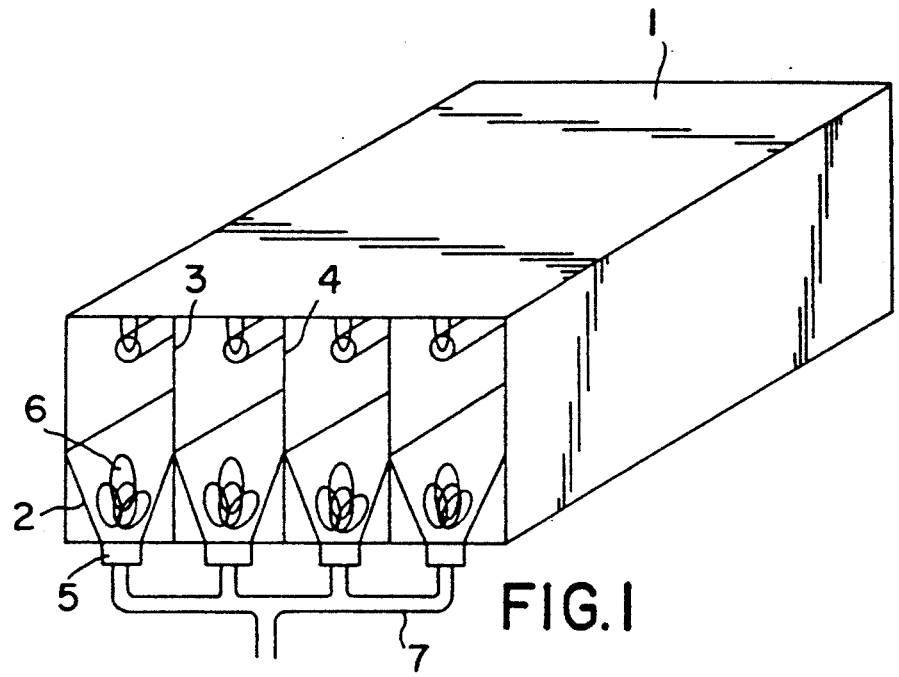
FIG. 1 is a perspective view illustrating an embodiment of the plant cultivating apparatus according to the present invention.
Figure 2:
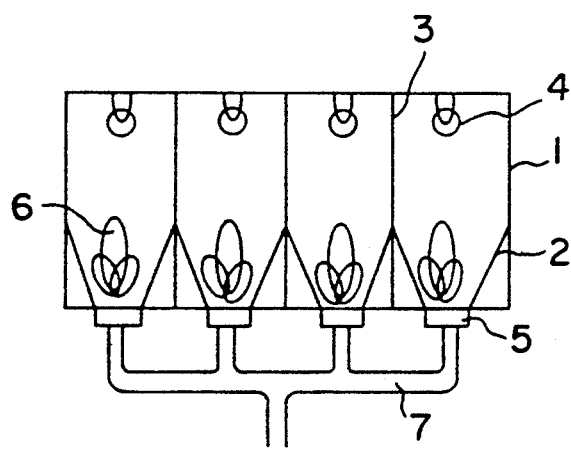
FIG. 2 is a front view of the apparatus shown in FIG. 1.

FIGS. 1 and 2 are perspective and front views showing embodiments of the present invention. Reference numeral 1 represents a cover, and reference numeral 2 represents a reflecting plate having a freely adjustable inclination angle, which is arranged in each chamber. Reference numeral 3 represents a partition wall having a high light reflectance, which partitions the cultivating chamber, reference numeral 4 represents a fluorescent lamp used as the artificial light source, reference numeral 6 represents a plant being cultivated, and reference numeral 7 represents a pipe for feeding and discharging a hydroponic solution. It is important that the distance between the plant 6 and the fluorescent lamp 4 is very close. This distance is determined according to the illuminance necessary for the growth of the plant, and it is generally in the range of 1 to 20 cm.

As mentioned hereinbefore, in accordance with one fundamental aspect of the present invention according to FIG. 1, there is provided a plant cultivating apparatus for cultivating plants by using an artificial light source 4 wherein a partition wall 3 having a high light reflectance is arranged on a cultivating space to divide the cultivating space into chambers, a light reflecting plate 2 is arranged in each chamber, and the distance between a plant and an artificial light source is shortened to irradiate the plant with a low-illuminance light.

In the plant cultivating apparatus having the above-mentioned structure, since seedlings of plants to be cultivated are set in the cultivating zone at appropriate intervals, environmental conditions such as temperature, humidity, carbon dioxide gas concentration and air speed in the cultivating zone, and nutrient composition, temperature and dissolved oxygen concentration in the hydroponic solution, are controlled to levels suitable for the growth of plants by a device controlling these environmental conditions ( described hereinafter ). Then, fluorescent lamps 4 are turned on to start cultivation of plants 6.

In the embodiment illustrated in FIG. 1, the plant cultivating apparatus has four chambers. If necessary, this apparatus can be expanded in the lateral direction or additional chambers can be stacked in the vertical direction.

In the case where vegetables such as lettuce are cultivated in a conventional cultivation apparatus, plants should be irradiated at an illuminance of about 20 Klx. In contrast, in the plant cultivating apparatus of the present invention, even under irradiation of a weak light at an illuminance of 5 to 10 Klx, a growth rate comparable to the growth rate attainable under irradiation with a strong light at an illuminance of 20 Klx can be attained if the temperature and carbon dioxide gas concentration are set at appropriate levels. Namely, even at an illuminance of 9 Klx, if cultivation is carried out at a temperature of 20° C. and a carbon dioxide gas concentration of 400 ppm, such a high cultivation rate can be obtained that the weight of lettuce is increased 2 times in two days. Even if the illuminance is reduced to 5 Klx, high-speed cultivation can be performed though the growth rate is reduced to some extent. In cases where light is applied from above, as in the conventional apparatus, the growth rate is drastically reduced at an illuminance of 5 Klx. Accordingly, the apparatus of the present invention is prominently different from the conventional apparatus.

The economic advantages of the plant cultivating apparatus of the present invention were examined with respect to cultivation of lettuce. It was found that when lamps providing light fluxes of 100 lm per W were used, the power necessary for obtaining 100 g of lettuce was about 0.7 KWH, a considerable power savings confirming that high power saving effects can be attained according to the present invention. One reason why such high power saving effects can be attained is that, in the plant cultivating apparatus of the present invention, since the distance between the lamp and plant is close and cultivation is carried out in a small space provided with a reflecting plate, the plants are set so they can effectively receive light irradiated from all directions.

As is apparent from the foregoing description, according to the present invention the light energy required for the growth of plants can be reduced and the structure of the apparatus can be made compact. Therefore, the quantity of energy required for air conditioning can be reduced, as well as construction expenses. These are some of the noteworthy advantages provided by the present invention.

Figure 3:
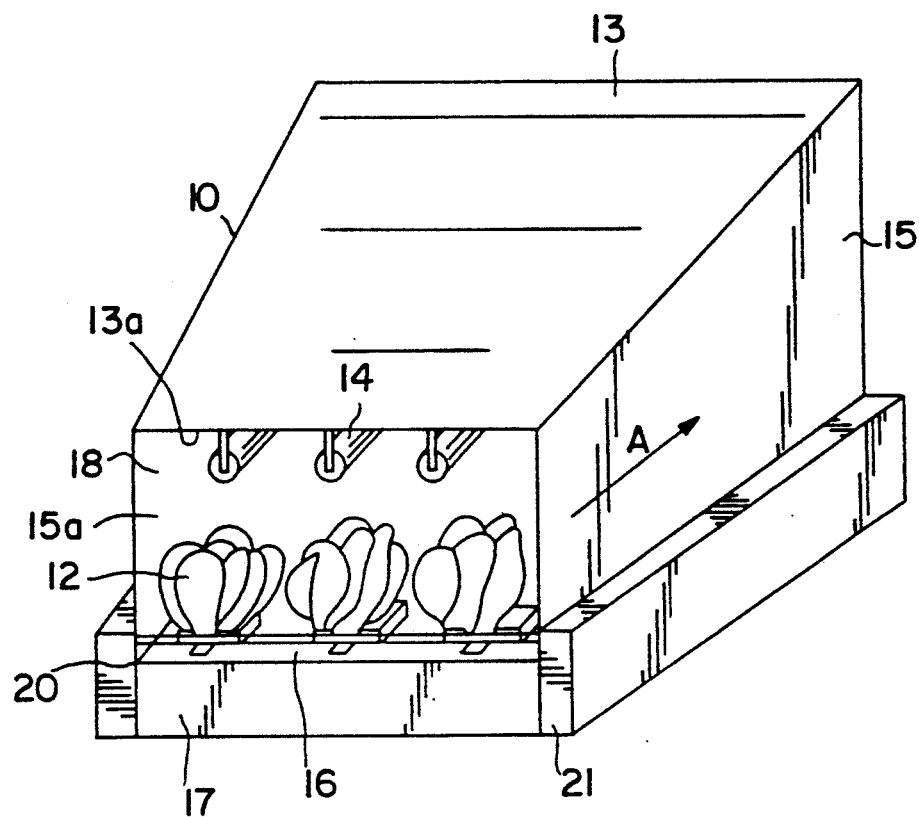
FIG. 3 is a perspective view illustrating another embodiment of the plant cultivating apparatus according to the present invention.
Figure 4:
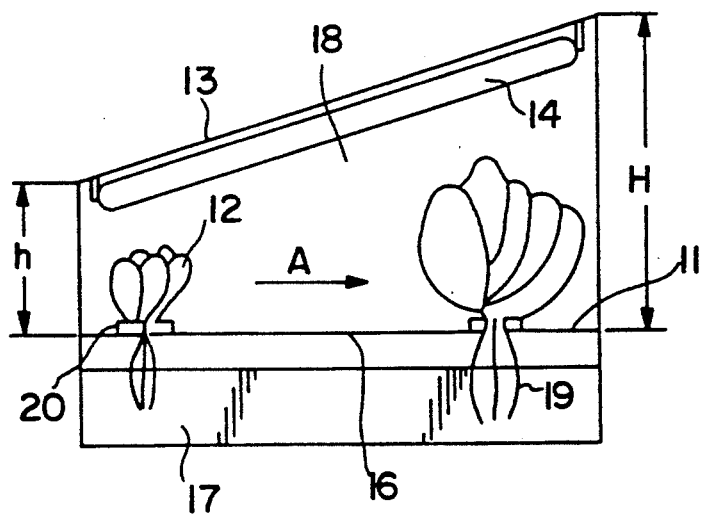
FIG. 4 is a side view of the apparatus of FIG. 3 seen by removing the right side plate.

FIGS. 3 and 4 are perspective and side views illustrating another embodiment of the present invention.

Figure 30:
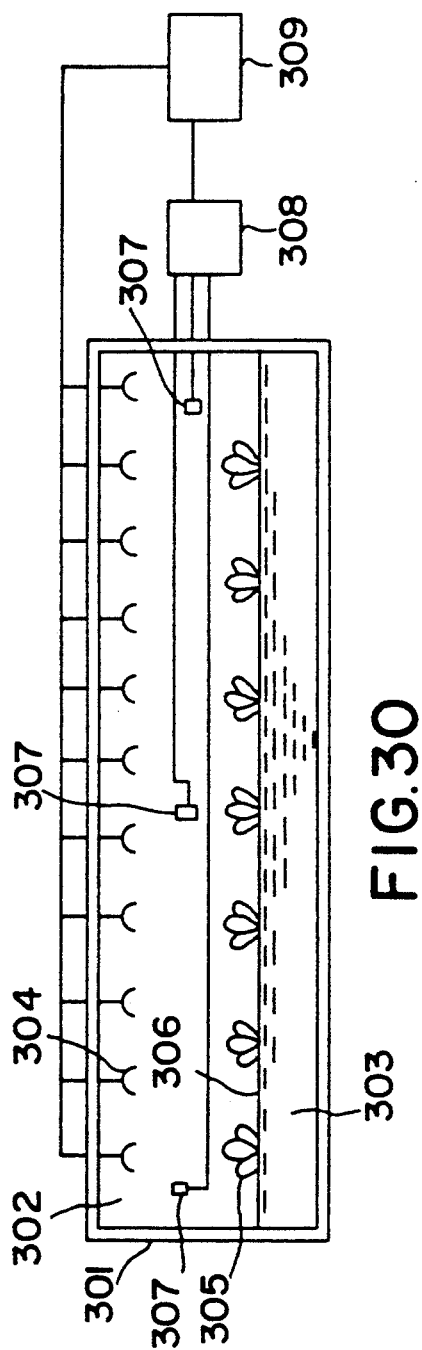
FIG. 30 is a diagram illustrating an example of the environment controlling device of the plant cultivating apparatus.

In the drawings, reference numeral 10 represents a plant cultivating apparatus, reference numeral 12 represents a plant, reference numeral 13 represents a ceiling panel having an optionally controllable inclination angle, reference numeral 13a represents a ceiling surface constructed of a reflecting plate having light reflections, which is arranged on the lower face of ceiling panel 13, reference numeral 14 represents a low-illuminance artificial light source such as a fluorescent lamp arranged on the ceiling panel 13. As illustrated in FIG. 30, strength of emission of the light source may be adjusted and the level of illumination of the plants controlled using sensors to obtain a desired illuminance of the plants in the growing chamber. By this means, power consumption can be reduced while providing optimum illumination of the plants at levels less than 10 klx as herein before stated to produce high growth rates. Reference numeral 15 represents a peripheral wall plate, reference numeral 15a represents a peripheral wall surface constructed of a reflecting plate of high light reflectance arranged on the inner face of the peripheral wall plate 15. Reference numeral 16 represents a growing bed and reference numeral 17 represents a hydroponic solution tank in which a hydroponic solution is stored or flows. Reference numeral 18 represents an illuminated space, reference numeral 19 represents the roots of a plant, reference numeral 20 represents a seedling charging zone, reference numeral 11 represents a harvesting zone, and reference numeral represents a moving device.

Seedlings charged from the seedling charging zone 20 are moved in a continuous manner and in substantially the same sequence in the direction indicated by arrow A in the drawings through graduated increased growth stages as they grow and become larger, and grown plants are harvested from the harvesting zone 11.

In this plant cultivating apparatus 10, the distance between the plants 12 and the fluorescent lamps 14 is shortened and the ceiling surface 13 is inclined so that the distance between the fluorescent lamps 14 and the growing bed 16 is small in the seedling charging zone 20 and large in the harvesting zone 11.

Figure 7:
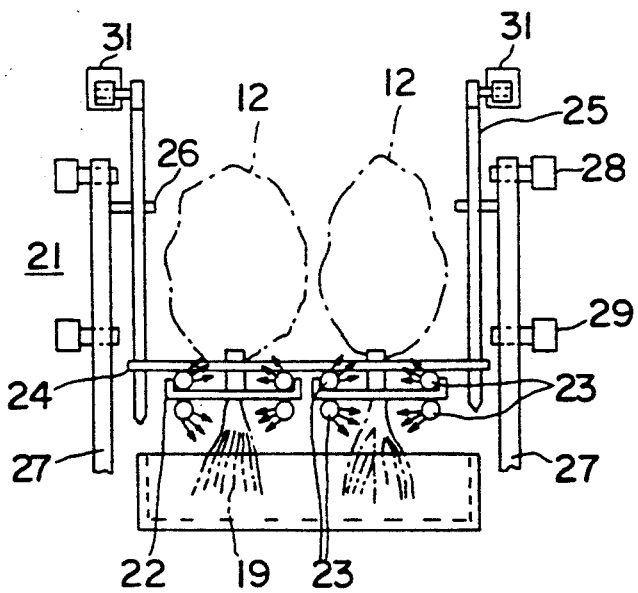
FIG. 7 is a front view of the moving apparatus shown in FIG. 5.

FIG. 5 is a plan view showing a part of the top face of the fan-shaped growing bed 16, FIG. 6 is a side view of the moving device 21, and FIG. 7 is a front view showing the moving device 21.

The surface of the growing bed 16 (FIG. 5) is formed of a material having a high reflectance. Reference numeral 22 represents a pallet for supporting the plant 12, reference numeral 23 represents a guide for moving the pallet 22 radially while maintaining an appropriate space between the plants 12 in accordance with the growth of the plants 12 on the pallet 22. Reference numeral 24 represents a telescopic moving rod for moving the pallet 22 along the guide 23, while reference numeral 25 represents a transport member for moving the moving rod 24. Reference numeral 26 represents a driving projection for moving the transport member 25, and reference numeral 27 represents a moving conveyor member to which the driving projections 26 are connected. Each of reference numerals 28 and 29 represents a conveyor support, and reference numeral 30 represents a guide roller.

The moving speed of the driving projection 26 in relation to the surface of the growing bed 16 increases the further along it moves in a forward direction. This is due to the configuration of the moving conveyor member 27 which is endless and in a zigzag fashion as shown in FIG. 6. Reference numeral 31 represents a guide rail and reference numeral 32 represents a conveyor driving motor.

The motor conveyor member 27 is a wave-shaped endless belt conveyor as shown in FIG. 6, and the driving projections 26 are equidistantly attached thereto. Each wave of the moving conveyor member 27 has the shape of an isosceles triangle, and the sums of the lengths of two isosceles sides is equal for all of the triangles but the bottom angle $\theta$ is gradually increased. One zone is formed by one wave or a plurality of waves. When this moving conveyor member 27 is moved at an equal speed by the conveyor driving motor 32, the moving rod 24 is moved and the plant 12 is moved along the guide 23 with the movement of the moving rod 24. The plants 12 are moved in such a manner that the spaces between the plants are equal in a portion corresponding to the wave and the spaces are broadened in the moving direction A in the subsequent wave.

Referring to FIGS. 3 through 7, the growing chamber of the plant cultivating apparatus 10 comprises a illuminated space zone 18 and a hydroponic solution tank 17. In the growing chamber, the temperature, the humidity, the carbon dioxide gas chamber concentration, the air speed, the composition and temperature of the hydroponic solution, and the dissolved oxygen concentration are controlled to levels suitable for the growth of the plants by a device (described hereinafter) for controlling these environmental conditions. Then, the fluorescent lamp 14 is turned on to start the cultivation of the plants.

As the plants 12 grow and become larger, the plants 12 are moved by the moving device 21 along the top face of the fan-shaped growing bed 16 shown in FIG. 3 in the direction of arrow A while the spaces are expanded in two dimensions.

The ceiling panel 13, that is, the ceiling face 13a, is inclined so that the height of the ceiling face 13a from the growing bed 16 is small in the seedling charging zone 20 and is large in the harvesting zone 11, and the plants 12 and the fluorescent lamps 14 are always relatively close during growth. Accordingly, the size of the illuminated space zone 18 can be diminished three dimensionally. In this structure, the plants can be confined within a small space, the plants can be uniformly illuminated with light, and the plants will have sufficient growth even by light of a low illuminance.

The distance between the plants 12 and the fluorescent lamps 14 is determined according to the illuminance necessary for the growth of the plants. In order to reduce the possibility of the leaf temperature of the plants significantly exceeding a suitable environmental temperature, it is preferred that this distance be 1 to about 20 cm. When a vegetable such as lettuce is cultivated by a weak light at an illuminance lower than 10 Klx, even if the distance between the plants and the fluorescent lamps 14 is shortened to 1 to 5 cm, the leaf will not exceed the suitable environmental temperature, and it has been confirmed that the plants will grow smoothly.

The inclination angle of the ceiling face 13a is determined according to the size of the seedlings and the size of plants 12 at the time of harvesting, and the height (h of FIG. 4) of the ceiling face 13a from the growing bed 16 in the seedling charging zone 20 is ordinarily about ½ to about 1/5 of the height (H in FIG. 4) in the harvesting zone 11. In case of a vegetable such as lettuce, it is preferred that the height h in the seedling charging zone 20 be about ⅓ of the height H in the harvesting zone 11, that is, about 10 to about 15 cm.

In cases where a vegetable such as lettuce is cultivated in conventional cultivating apparatus, irradiation with a light at an illuminance if about 20 Klx is indispensable. In contrast, in the plant cultivating apparatus 10 of the present invention, a light providing an illuminance lower than 10 Klx is sufficient, and a growing speed comparable to that attainable in the case of irradiation with a strong light at 20 Klx, even with a weak light providing illuminance of about 5 Klx, can be obtained if the temperature and carbon dioxide gas concentration are maintained at preferred levels. More specifically, it has been found that even at an illuminance of 7 Klx, if the cultivation is carried out at a temperature of 15° C. and a carbon dioxide concentration of 4000 ppm, lettuce can be cultivated at such a high rate that there is a two-fold increase in weight in 2 days. Moreover, it has been confirmed that even if the illuminance is reduced to 5 klx under the above conditions, the growing rate is somewhat reduced but cultivation can be performed at a high rate. On the other hand, in a conventional cultivating apparatus, the growing rate is drastically reduced at an illuminance of 5 Klx. Accordingly, the apparatus of the present invention is clearly distinguishable over the conventional apparatus.

Energy consumption of the plant cultivating apparatus 10 of the present invention was examined with respect to cultivation of lettuce. As a result, it was found that when lamps providing 100 1 W (lumens per watt) were used, the power necessary for obtaining 100 g of lettuce was about 0.6 KWH and considerable power can be saved.

One reason why such a high power saving effect can be attained according to the present invention is that, since the total peripheral wall surface 15a in the growing chamber is covered with a reflecting material having a high reflectance along with the ceiling face not only being composed of a material having a high reflectance but also being inclined to confine plants in a narrow space, the plants can be uniformly irradiated and can receive light effectively.

In the present embodiment, the fluorescent lamps 14 are concentrated on the ceiling panel 13, but a similar effect can be attained even if they are dispersed in the peripheral wall surfaces 15a.

Furthermore, in the present embodiment, fluorescent lamps are used as low-illuminance artificial light sources, but illuminating devices for applying light transmitted from low-illuminance artificial light source through optical fibers may also be used.

In the plant cultivating apparatus 10 of the present embodiment, one row comprises three plants 12. If necessary, the apparatus may be expanded in the lateral direction.

Another embodiment of the plant cultivating apparatus of the present invention will now be described with reference to FIG. 8.

Figure 8:
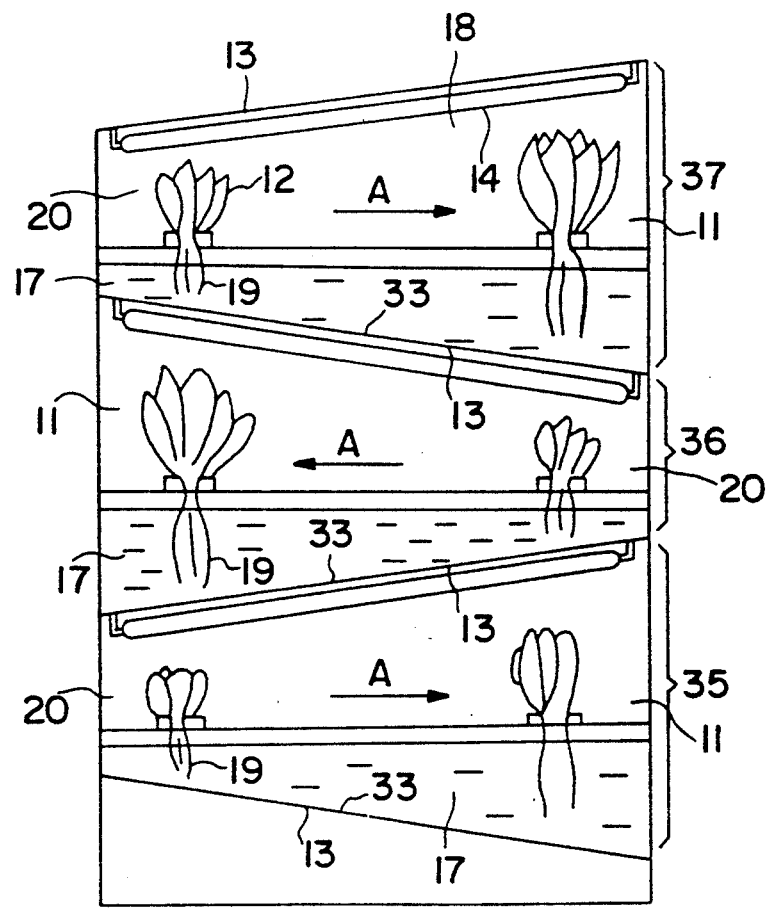
FIG. 8 is a side view showing another embodiment of the plant cultivating apparatus according to the present invention.

In FIG. 8, the plant 12, ceiling panel 13, fluorescent lamp 14, hydroponic solution tank 17, illuminated space zone 18, plant root 19, seedling charging zone 20 and harvesting zone 11 are the same as described hereinbefore with reference to FIGS. 3 and 4.

In this embodiment, however, as shown in FIG. 8, growing chambers are stacked in the longitudinal direction so that the direction of movement of the plants 12 moving according to the growth are alternately opposite as indicated by arrows A. Reference numeral 33 represents a bottom plate of the hydroponic solution tank 17, which is inclined so that the liquid depth is small at the initial stage of cultivation, that is, in the seedling charging zone 20 where the roots 19 are small, and the liquid depth is large at the terminal stage of cultivation, that is, in the harvesting zone 11 where the plants 12 have matured and the roots 19 are large. Since the growing chambers 35, 36 and 37 are stacked so that the moving directions are opposite one another, the ceiling panel 13 and bottom plate 33 are combined.

In the present embodiment, since the bottom plate 33 is inclined so that the liquid depth of the hydroponic solution tank 17 is small in the portion where the roots 19 of the plants 12 are small and the liquid depth is large in the portion where the roots 19 are large, the volume of the hydroponic solution tank 17 can be diminished and the amount of the hydroponic solution can be reduced. In the case of vegetables such as lettuce, since the length of the plant roots 19 is substantially equal to the length of the leaf portion above the surface of the growing bed 16, the degree inclination of the bottom plate 33 of the hydroponic solution tank 17 can be made equal to that of the ceiling panel 13. Accordingly, if the bottom plates 33 are combined with the inclined hydroponic solution tanks 17 and inclined ceiling panels 13 so that the moving directions of the plants are alternately opposite, a three-dimensionally compact plant cultivating apparatus can be constructed. Of course, a plurality of plant cultivating apparatuses having the above-mentioned structure may be stacked in multiple stages.

Since the moving directions of the plants are made alternately opposite so that the hydroponic solution tank 17 of the growing chamber of the upper stage having the inclined bottom plate 33 is combined with the illuminated space 18 of the growing chamber of the lower stage having the inclined ceiling panel 13, the growing chambers can be effectively stacked in multiple stages, and the height of the illuminated space 18 is reduced. Accordingly, a three-dimensionally compact plant cultivating apparatus can be constructed, with the result that land utilization efficiency can be notably increased.

In the present invention, three growing chambers are stacked in the longitudinal direction to construct the plant cultivating apparatus. However, the number of stages may be as few as 2, or increased to 4 or more according to need. Moreover, the apparatus may be expanded in the lateral direction.

In the foregoing embodiment, a plurality of artificial light sources are arranged in the ceiling panel of the growing chamber, but they may also be arranged on the peripheral wall surface of the growing chamber and also, in this case, the above-mentioned effect can be similarly attained.

As is apparent from the foregoing description, in the present embodiment, since the ceiling panel is inclined in accordance with the growth of plants so that the distance between plants and artificial light sources is optimal, the light energy required for the growth of plants can be reduced and the volume of the illuminated space can be diminished. Accordingly, the amount of supplied air can be reduced and the apparatus can be made more compact, resulting in lowering the height of the structure. These advantages are realized in the present embodiment.

Moreover, since the bottom plate of the hydroponic solution tank is inclined so that plants are moved in directions alternately opposite to one another, the amount of the hydroponic solution required for the growth of plants can be reduced. Furthermore, since this inclined bottom plate is combined with the inclined ceiling panel, growing chambers can be stacked in multiple stages and the utilization of land efficiency can be greatly increased and, hence, the plant cultivating apparatus of the present embodiment is especially effective from a practical viewpoint.

Still another embodiment of the present invention will now be described with reference to FIG. 9.

Figure 9:
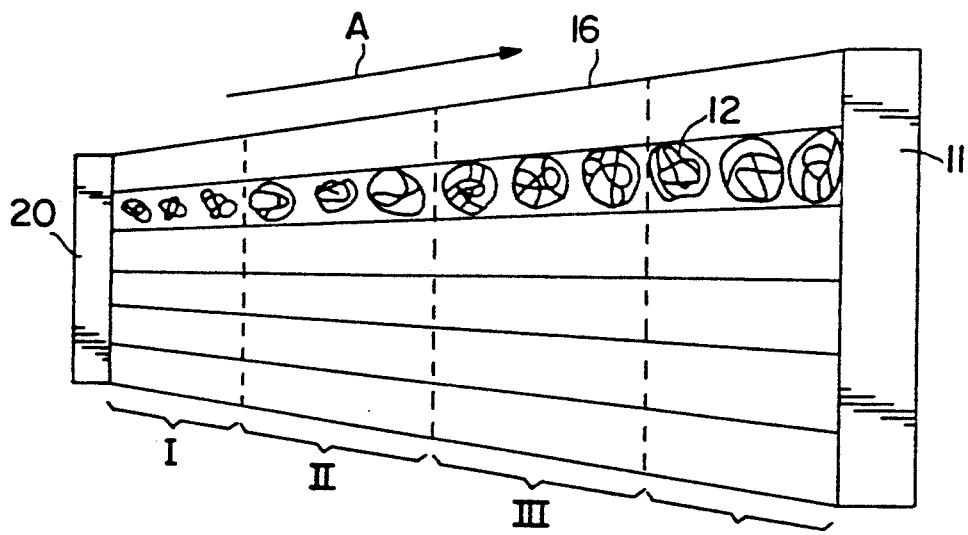
FIG. 9 is a top view illustrating a cultivating bed in another embodiment of the plant cultivating apparatus according to the present invention.

Referring to FIG. 9, the apparatus is constructed so that plants 12 on the growing bed 16 are moved from the seedling charging zone 20 to the harvesting zone 11 in the direction of arrow A by the above-mentioned moving device 21 while the spaces between the plants 12 are broadened. Artificial illuminating devices 14 are arranged above or on the sides of the growing bed 16. The growing bed 16 is divided into a plurality of zones, for example, four zones I, II, III and IV in the present embodiment, and the illuminance of the respective zones is alternately changed so that a strong illuminance zone and a weak illuminance zone appear in sequence from the seedling charging zone 20.

In case of the former pattern, seedlings of plants 12 charged from the seedling charging zone 20 grow under strong illuminance conditions in zone I and they acquire compact shape. Then the plants 12 are transferred to zone II where there would normally be a tendency for excessive growth but, because of the influence of the previous strong illuminance zone I, the plants grow effectively. Then, the plants are introduced into the strong illuminance zone III and grow while the tendency of excessive useless growth caused in the zone II is controlled.

This process can be repeated as many times as is necessary according to the kind of plant to be grown and the cultivation period. The widths of the respective zones are then determined according to these conditions.

Under some growth conditions, growth is inhibited if seedlings of plants are directly exposed to light having a strong illuminance. In this case, zone I may be irradiated with a light of a weak illuminance.

For example, in the case of lettuce, at a low illuminance of 5 to 7 klx, cultivation can be efficiently performed by a reduced illumination power, as pointed out hereinbefore. In this case, however, a slight tendency of excessive useless growth is observed in leaves. If the plants are irradiated with a light of an illuminance of 10 to 18 Klx, high illuminance, the tendency toward excessive growth is controlled, though the power utilization efficiency is somewhat reduced. If this illumination pattern is repeated throughout the apparatus, high-grade plants having no excessive growth can be relatively efficiently and economically obtained. In the present embodiment having the above-mentioned structure, since low-illuminance irradiation and high-illuminance irradiation are alternately repeated during the cultivation period, excessive growth can be controlled, power consumption can be reduced, and there can be provided a plant cultivating apparatus in which plants having a high commercial value can be obtained at reduced power consumption.

Furthermore, since plants can be cultivated in a relatively compact manner, the area of the growing bed can be reduced and the number of illuminating lamps necessary for obtaining a predetermined illuminance can be reduced. Therefore, equipment cost illumination power consumption can be reduced. Consequently, the entire cultivation cost can be reduced, making the plant cultivating apparatus of the present embodiment economically advantageous.

Still another embodiment of the present invention will now be described with reference to FIG. 10.

Figure 10:
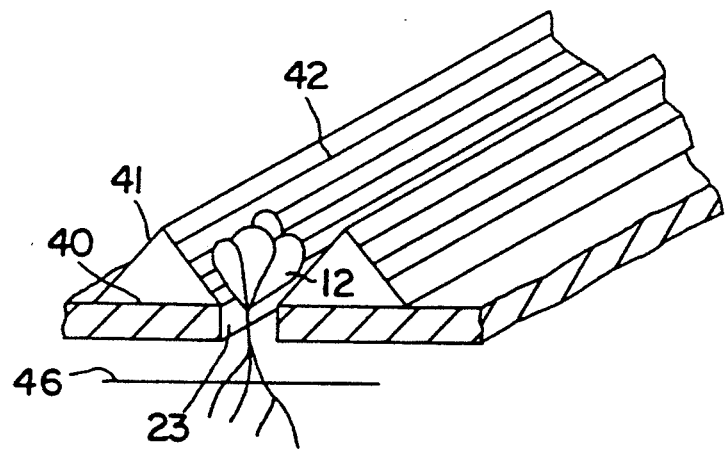
FIG. 10 is a perspective view showing an example of the plant restraining member according to the present invention.

Referring to FIG. 10, in the plant cultivating apparatus of the present embodiment, a plant restraining member 41 having inclined side faces is formed on a plant support 40 so that the plants 12 are supported from both the left and the right sides. The side faces of the plant restraining member 41 are constructed by line members 42 so that the effect of reflecting light from the top face of the plant support 40 is not inhibited. In accordance with the growth, the plants 12 extend upward while being supported by the side faces of the left and right plant restraining members 41 without expansion over the top face of the plant support 40.

If the above arrangement is not adopted, due to the growth of the plants 12, the plant support 40 is covered with leaves of the plants 12, and growth of the plants 12, by utilizing the reflection of light to the floor surface from above, becomes difficult. On the other hand, if the above-mentioned plant restraining members 41 are formed on the plant support 40, the growth of the plants 12 is forcibly directed upwards by the plant restraining members 41, so that the cultivation area can be reduced and the plants 12 are effectively irradiated with light without attenuating the light reflection.

The plants 12 are set at certain spaces in a controlled, that is, air-conditioned, atmosphere in which the temperature, humidity and carbon dioxide concentration are controlled and the hydroponic solution 46 is circulated while controlling the dissolved oxygen concentration, pH value, electric and nutrient balance. The plants are grown by the light of the fluorescent lamps 14 attached to the ceiling face and also by the photosynthesis of the nutrients by the hydroponic solution 46 below the plant support 40 while the plants are kept stationary or moved according to their growth.

The fluorescent lamps 14 are kept close to the plants 12 which are set in holes of the plant support 40, to promote photosynthesis on the leaf surfaces of the plants 12, whereby the plants can be cultivated at a high speed. Water and nutrients are supplied to the plants 12 through the hydroponic solution 46 located below the plant support 40.

Figure 11:
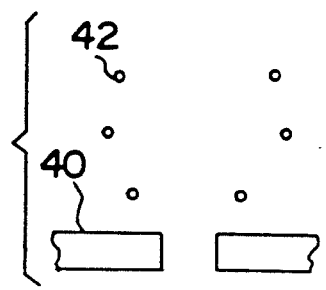
FIG. 11 is a front view showing a modification of the plant restraining member in which the arrangement of like members is changed.
Figure 12:
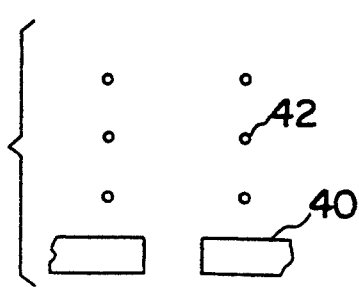
FIG. 12 is a front view showing yet another modification of the plant restraining member in which the arrangement of line members is changed.

In the present embodiment, the side faces of the plant restraining member 41 are constructed by arranging the line members 42 in a staggered manner to form inclined surfaces for effective illumination of light. However, the line members 42 may be arranged in a bow-like shape, as shown in FIG. 11, or the line members 42 may be arranged vertical to the floor surface, as shown in FIG. 12.

Figure 13:
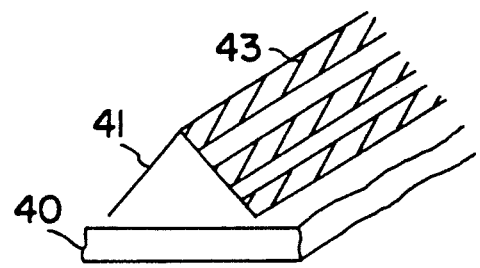
FIGS. 13 through 15 are perspective views showing different variations of the plant restraining member of the present invention.
Figure 14:
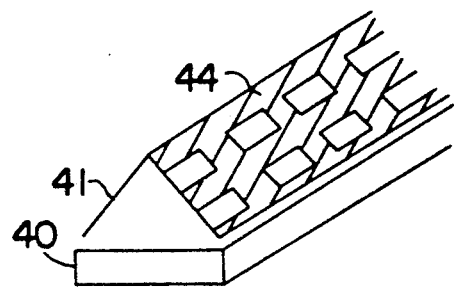
Figure 15:
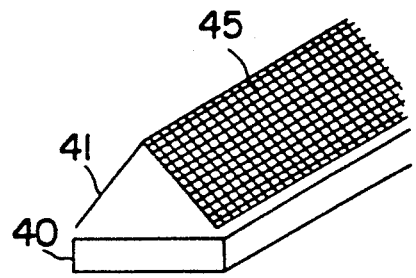

Moreover, as shown in FIGS. 13 through 15, the inclined face of the plant restraining member 41 may be constructed by web-like plates 43 spaced from one another, a lattice-like structural member 44 or a net-like mesh member 45 instead of the line members 42 shown in FIG. 10. Instead of these triangular structures, a bow-like structure as shown in FIG. 11 or a structure vertical to the floor surface as shown in FIG. 12 may be adopted to regulate the shape of the plants 12 if the growth of the plants 12 is not hindered.

Figure 16:
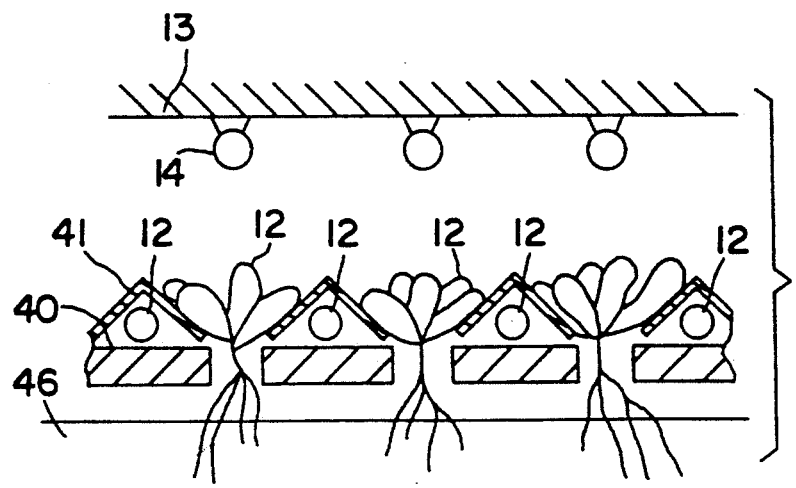
FIG. 16 is a sectional front view showing an embodiment in which an artificial light source is arranged in the plant restraining member.

Furthermore, as shown in FIG. 16, an artificial light source 14 such as a fluorescent lamp is arranged within each triangle portion. In this case, the plants 12 are supported from the left and right and, simultaneously, the photosynthesis is assisted by these light sources.

Moreover, a reflecting plate may be arranged on the plant restraining member 41 so that light is not passed through the plant restraining member 41 but is reflected therefrom. Still further, this reflecting plate may be arranged on the side of the plants to support the plants without reducing the effect of the reflecting plate.

In the foregoing embodiment, the plant support 40 is arranged separately from the plant restraining member 41, but they may be integrated. Moreover, in the foregoing embodiment, the cultivating apparatus is used for environment-controlled cultivation, but the cultivation apparatus can also be for cultivation on a non-controlled environment, for example, the outdoor field cultivation of plants.

Figure 17:
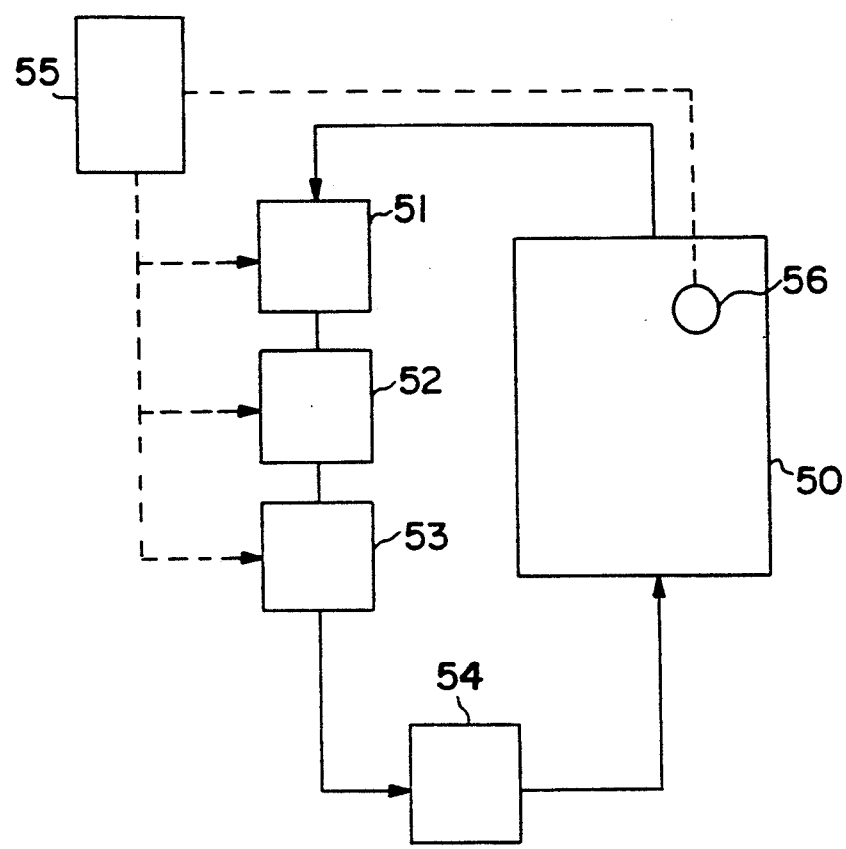
FIG. 17 is a block diagram of a control device for the plant cultivating apparatus.

Control of the environmental conditions in the space where the plants 12 are set is accomplished by a device shown in FIG. 17. In FIG. 17, reference numeral 50 represents a growing chamber, reference numeral 51 represents a temperature regulator, reference numeral 52 represents a humidity regulator, reference numeral 53 represents a carbon dioxide gas concentration regulator, reference numeral 54 represents a circulating line pump for circulating a gas in the cultivating space, and reference numeral 55 represents a control device for controlling the regulators based on detection signals from a sensor 56 arranged in the growing chamber 50 or a gas conduit extended from the chamber 50. The gas coming from the growing chamber 50 is passed through the temperature regulator 51, the humidity regulator 52 and the carbon dioxide gas concentration regulator 53, fed under pressure by the controlled circulating line pump 54 and returned into the growing chamber 50 to promote the growth of plants 12.

In the growing chamber 50, fluorescent lamps 14 are arranged to grow the plants 12 and a hydroponic solution 46 is circulated by using a hydroponic bed. The plants 12 are set to grow in this hydroponic bed.

Regulation of the temperature, humidity and carbon dioxide gas concentration is accomplished by measuring the temperature, humidity and carbon dioxide gas concentration in the growing chamber 50 by the sensor 56, feeding the detection signals to the control device 55 and controlling the temperature regulator 51, humidity adjusting member 52 and carbon dioxide gas regulator 53 based on these signals to produce conditions optimum for the growth of the plants in the growing chamber 50.

Of course, also in this embodiment, if the plant cultivating apparatus is constructed so that the plants 12 are moved in accordance with the growth thereof, the plant restraining member 41 should be disposed so that the spaces between the plants 12 are expanded along the moving direction of the plants 12 with the growth of the plants 12, and the leaves of the plants 12 are moved along the top face of the plant restraining member 41 so that the leaves are not left on the floor surface.

In the case where the plants 12 are not moved but are grown at the set position, it is preferred that the plant restraining member 41 be opened in accordance with the growth of the plants 12.

When the plants 12 are vegetables, since leaves are soft and thin, they are readily broken. Accordingly, in this case, metal or material having sharp corners should not be used for the plant restraining member 41 but a soft material which does not damage leaves having rounded corners is used for the plant restraining member 41, though the kind of material is not particularly critical.

According to the present embodiment, as pointed out hereinbefore, the plant restraining member is arranged on the plant support to support the plant from the left and right and expansion of leaves on the floor surface with the growth of the plant is forcibly directed upward by the plant restraining member. Accordingly, the cultivation area can be reduced and the light reflecting effect is not lowered. Moreover, the shape of the plants is regulated and high-grade plants having high product quality can be obtained. Furthermore, in this plant cultivation apparatus, plants cam be cultivated while saving energy. These are effects attained according the present embodiment.

Figure 18:
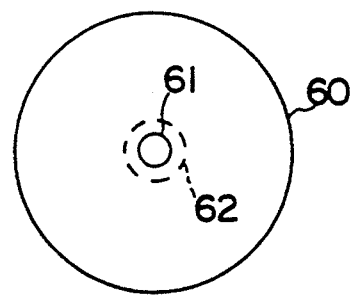
FIG. 18 is a top view showing a planting tool in the plant cultivating apparatus.
Figure 19:
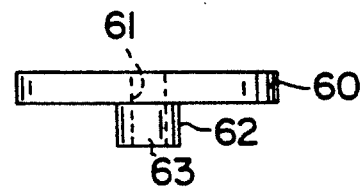
FIG. 19 is a side view of the planting tool shown in FIG. 18.
Figure 20:
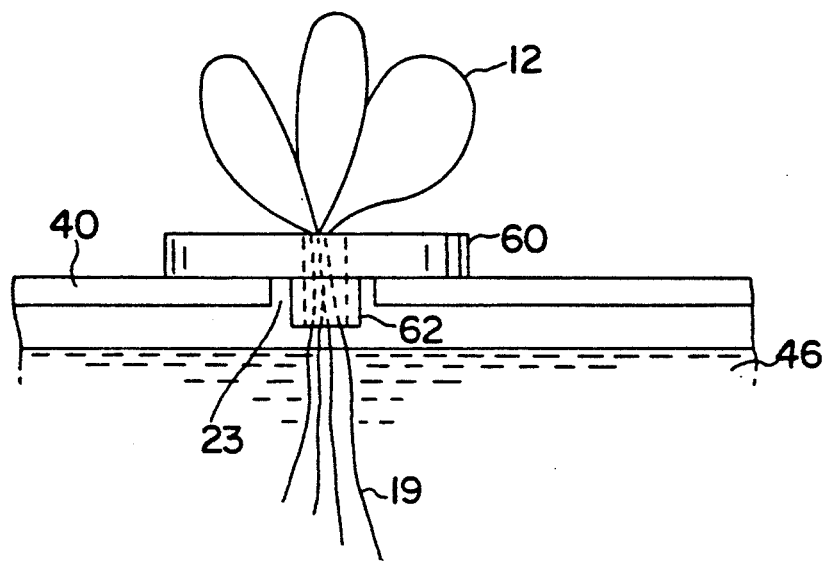
FIG. 20 is a side view of a main portion of the plant cultivating apparatus to which the planting tool shown in FIGS. 18 and 19 is attached.

FIGS. 18 and 19 are top and side views of a planting tool in the plant cultivation apparatus according to still another embodiment of the present invention. FIG. 20 is a side view showing a main part of the plant cultivating apparatus to which this planting tool is attached.

In the drawings, reference numeral 60 represents a circular pallet having at the center thereof a hole 61 through which the roots 19 of a plant 12 are set, and reference numeral 62 represents a cylindrical projection having a through hole 63 aligned with the hole 61. Through this through hole 63, the roots 19 of the plant are immersed in a nutrient liquid 46. The cylindrical projection 63 is fitted in a planting tool-moving groove 23 formed in a stage 40 of the plant cultivating apparatus and is moved along this groove 23.

Since the planting tool having the above-mentioned structure can be moved so that the space between adjacent tools is expanded, the ares of the portion to be contacted with the floor surface can be reduced, modulated frictional losses, with the result that the driving force necessary for driving the moving device can be reduced.

Although it is appreciated that the pallet will be turned when this tool is moved, since the pallet has a circular shape, the pallet can always be moved smoothly.

Figure 21:
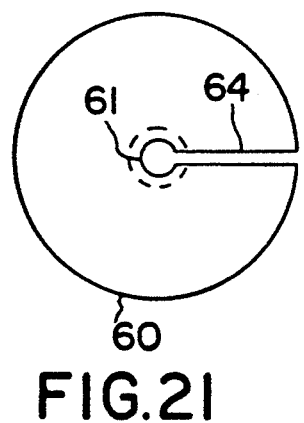
FIG. 21 is a plan view of yet another planting tool.
Figure 22:
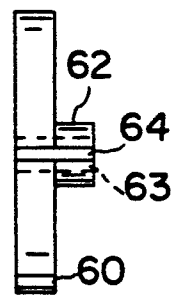
FIG. 22 is a side view of the planting tool shown in FIG. 21.

FIGS. 21 and 22 are top and cross-sectional showing an improved pallet for use in the plant cultivating apparatus according to still another embodiment of the present invention. In FIGS. 21 and 22, a notch 64 extends from a through hole 63 of a cylindrical projection 62 to the outer peripheral edge of a circular pallet 60. If this structure is adopted, a plant 12 can be easily inserted into the trough hole 63 and removed therefrom without damaging the roots 19 of the plant.

As is apparent from the foregoing description, in the present embodiment, the improved pallet comprises the circular pallet 60 having at the center thereof the hole 64 for setting the root of the plant therein and the cylindrical projection 62 having the through hole 63 aligned with said hole, which is moved in the pallet-guiding groove 23 while immersing the plant roots in the nutrient liquid through the through hole. By virtue of this structure, since the respective pallets are independently moved in accordance with the growth of plants to broaden the spaces between adjacent tools, the area of the portion to be contacted with thee floor surface is reduced and the power necessary for the movement can be moderated.

Furthermore, since the pallet is circular and has no directionality, there is the resulting effect that this movement can be easily performed.

Figure 23:
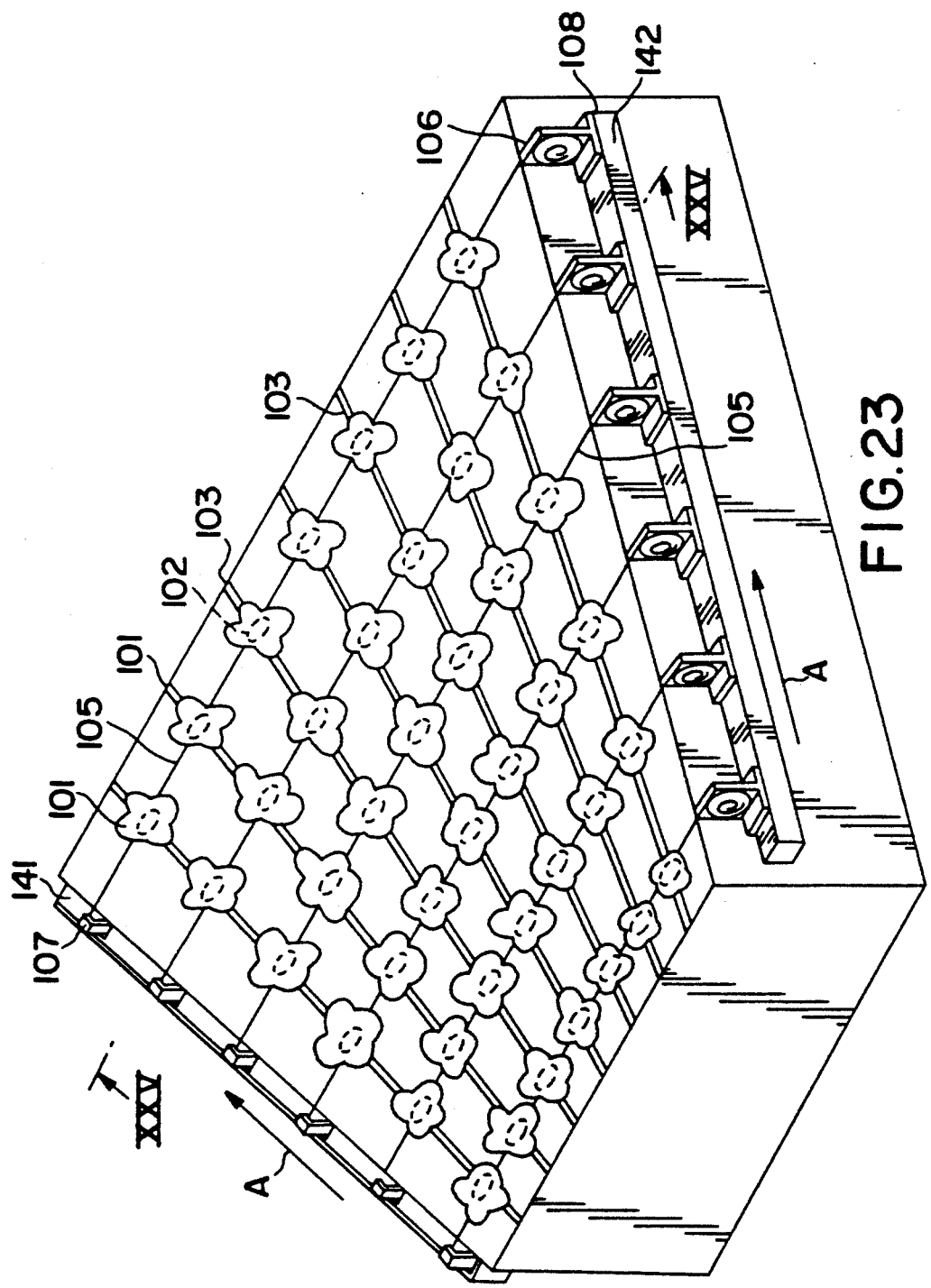
FIG. 23 is a perspective view showing an example of the moving device of the plant cultivating apparatus.
Figure 24:
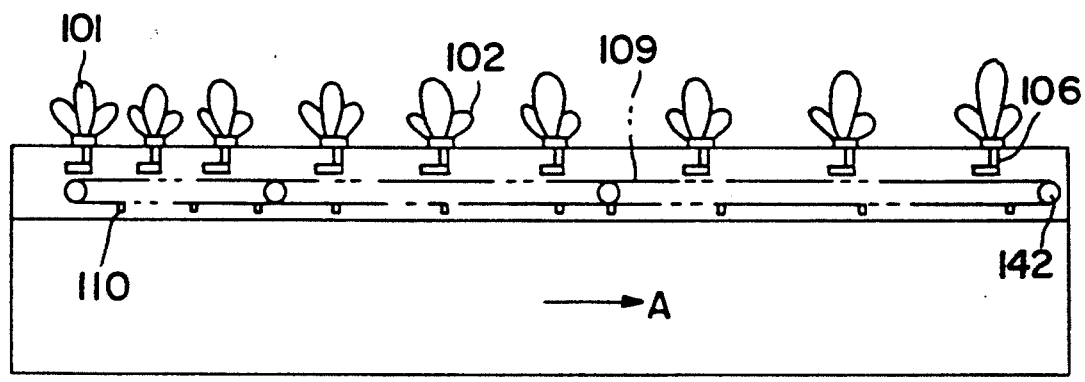
FIG. 24 is a side view of the moving device shown in FIG. 23.
Figure 25:
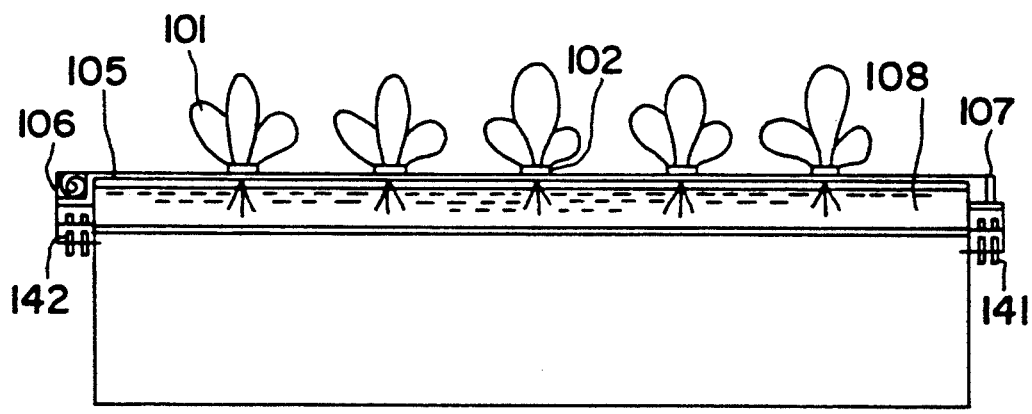
FIG. 25 is a view showing the section taken along the line XXV—XXV in FIG. 23.

FIG. 23 is a perspective view illustrating the plant cultivation apparatus according to still another embodiment of the present invention. FIG. 24 is a side view of the apparatus shown in FIG. 23, and FIG. 25 is a view showing the section taken along the line XXV—XXV in FIG. 23. In the drawing, reference numeral 101 represents a plant, reference numeral 102 represents a pallet having the plant 101 set therein, reference numeral 103 represents a groove for guiding the pallet 102, which is extended radially in the advance direction (A) of the pallet 102. Reference numerals 141 and 142 represent moving devices arranged on both the ends of the pallets arranged in rows, which move in the advance direction (A), and reference numeral 105 represents a flexible push-out member 105 which is preferably a wire. One end of the push-out member 105 is supported by a wire supporting member 107 connected to the moving device 141, and the other end of the wire 105 is wound on a winding device 106 connected to the moving device 142. Reference numeral 108 represents a rail for moving the winding device 106, and reference numeral 109 represents a driving chain having a plurality of push-out keys 110 connected to the supporting member 107 or winding 106.

Figure 26:
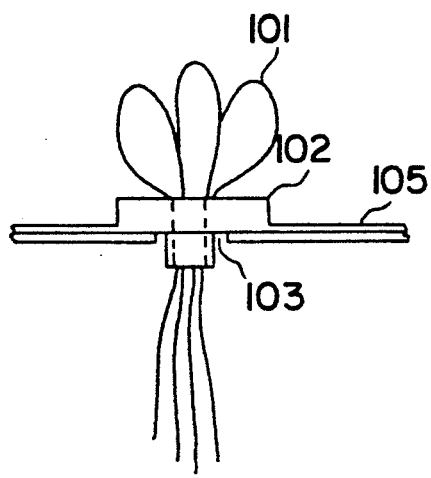
FIG. 26 is a side view showing an example of the pallet used for the plant cultivating apparatus.

FIG. 26 is a sectional side view showing an example of the pallet used in an embodiment of the plant cultivation apparatus of the present invention. The state where the pallet 102 having the plant 101 set therein is fitted in the groove 103 in advance direction by the wire 105 is illustrated in FIG. 26.

Figure 27:
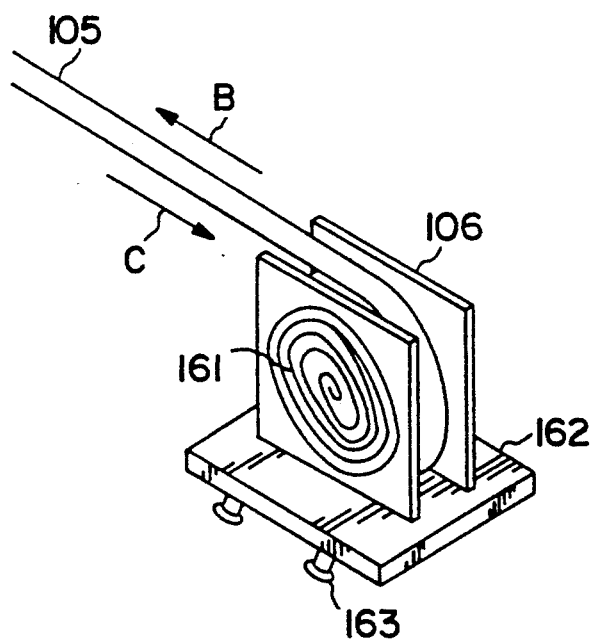
FIG. 27 is a perspective view showing an example of the winding device of the plant cultivating apparatus.

FIG. 27 is a perspective view showing an example of the winding device used in the plant cultivation apparatus of the present invention. In FIG. 27, reference numeral 161 represents a winding tension spring, reference numeral 163 represents a wheel for the truck 163 upon which the winding device 106 is situated.

Figure 28:
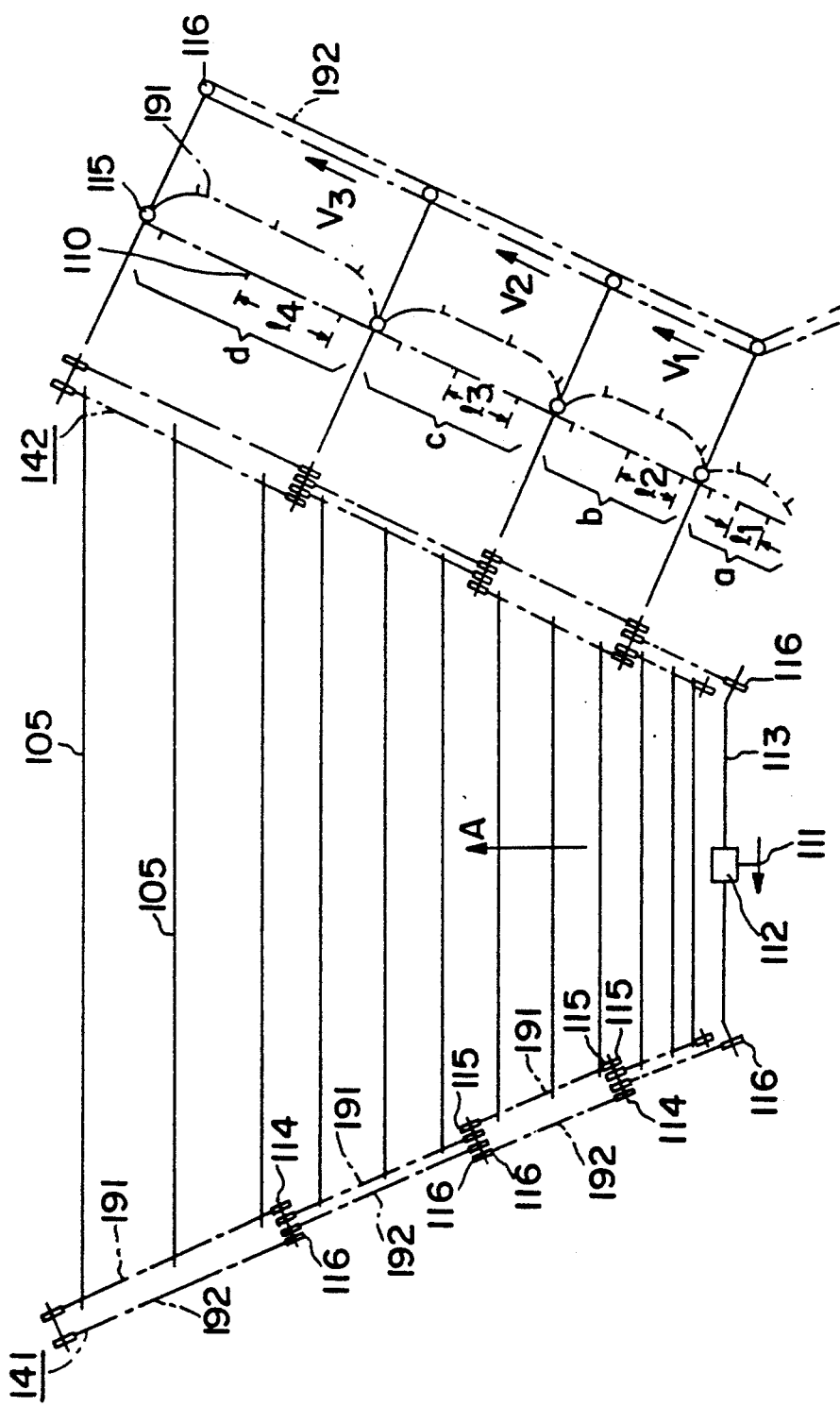
FIG. 28 is a diagram illustrating the side structure and plan structure of the moving device.
Figure 29:
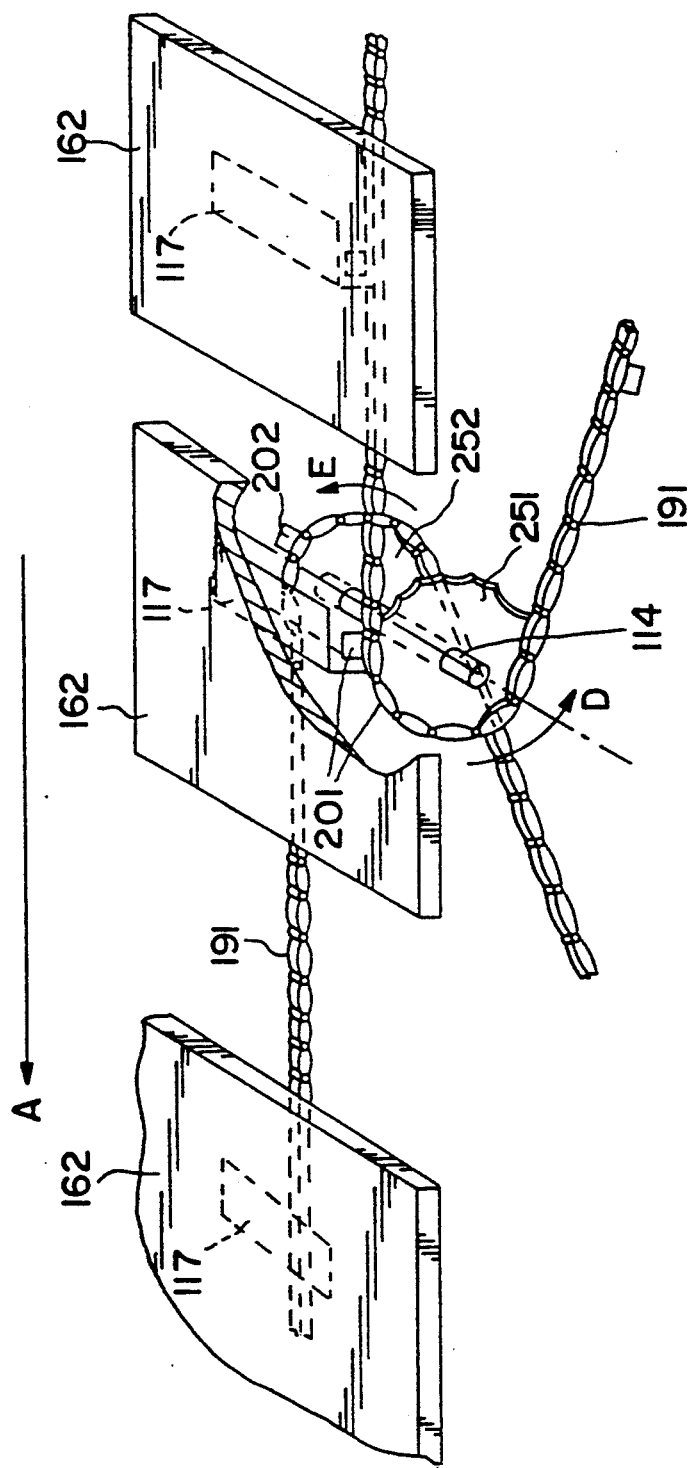
FIG. 29 is a partially cut-out perspective view showing a main portion of the moving device.

FIG. 28 is a diagram illustrating the side structure and plain structure of an example of the moving device used in the plant cultivation apparatus of the present invention, and FIG. 29 is a partially cut-out perspective view showing a main part of the moving device.

In FIGS. 28 and 29, reference numeral 111 represents a handle, reference numeral 112 represents a reduction gear, reference numeral 113 represents a shaft, reference numeral 114 represents a connecting shaft, reference numeral 115 represents a moving sprocket, reference numeral 116 represents a driving power transmitting sprocket, reference numeral 117 represents a key receiver attached to the back side of the stationary truck of the winding device 106 or the supporting member 107, reference numeral 191 represents a moving driving chain, and reference numeral 192 represents a driving power transmitting chain.

The operation will now be described with reference to FIG. 23.

In accordance with the growth of plants 101, pallets are arranged in rows are moved in the direction orthogonal to the row direction, that is, are moved in the direction A, while broadening the spaces between adjacent pallets. For this purpose, the winding device on the rail 108 and the wire supporting member 107 are moved in the direction A by moving devices 141 and 142 described hereinafter. A%, this point, since the rail 108 is radially extended in the direction A according to the expansion of the distance between the grooves 103, the distance between the winding device 106 and the wire supporting member 107 is broadened. To this expansion, as shown in FIG. 27, the wire 105 is fed out in the direction B, and the wire 105 generates a push force for moving the plants arranged in a row, that is, the pallets, in the direction A. Accordingly, the wire 105 comes to have a tension in the direction C because of the winding tension spring 161 and the wire 105 becomes rigid and uniform. If the pallets are continuously moved in the direction A, the wire 105 is fed out under tension in the direction B. Therefore, the length of the wire is kept equal to the length of the set of pallets in the row direction, and no superfluous space is necessary. Since each pallet 102 is moved in the direction A along the radially arranged groove 103, the spaces between pallets in the row direction are expanded as they are moved in the direction A.

The operations of the moving devices 141 and 142 will now be described.

The spaces between the pallets in the direction A are broadened, as shown in FIG. 24, according to the growth of plants 101, that is, according to the movement in the direction A. For this purpose, each of the moving devices 141 and 142 is constructed by a plurality of driving chains 109 having a plurality of push keys 110 which engage with the supporting member 107 or winding device 106. Keys 110 are unevenly spaced and are connected to one another. Speed-changing means for changing the moving speed of each driving chain 109 are provided in the advance direction.

Referring to FIGS. 28 and 29, when the handle 111 is turned, the driving power transmitting sprocket 116 is driven through the reduction gear 112. The driving power transmitting chain 192 is advanced in the direction A through the driving power transmitting sprocket 116, and each sprocket 116 is rotated to thereby rotate the moving sprocket 115 connected to the sprocket 116 through the common shaft 114 (connecting shaft) and to advance the moving driving chain 191 in the direction A. The numbers of teeth in the driving power transmitting sprockets 116 vary so that the speed of the driving power transmitting chain 192 can be changed in zones A, B, C and D. Therefore, the revolutions of the moving sprockets 115 and the speed of the moving driving chains 191 can be altered.

At this point, the driving power transmission on the left side and the driving power transmission on the right side are simultaneously advanced by the moving devices 141 and 142, and the push keys 110 arranged on the moving driving chain 191 are located symmetrically with respect to the advance direction. Accordingly, the key receivers 117 moving above the keys are similarly located symmetrically with respect to the advance direction to move the sets of pallets in parallel. The key spaces 11, 12, 13 and 14 in the zones A, B, C, and D are gradually increased from the zone A toward the zone D. Namely, the push key 110 engages with the key receiver 117 attached to the lower portion of the supporting member 107 or the truck 162 or the winding device 106. Thus, the wore 105 connected between the supporting member 107 and the winding device 106 is advanced to move the pallets 102 along the groove 103.

Transportation of the supporting member 107 and the winding device 106 from one zone to the next zone is accomplished in the following manner. As shown in FIG. 29, the moving sprocket 251 is rotated in the direction D and the key 201 pushes and advances the key receiver 117. The key 201 is then turned downward along the sprocket 251 thus disengaging it from the key receiver 117. The key 202 attached to the moving driving chain 191 of the next zone appears upward while being rotated in the direction E, and the key 202 engages with the key receiver 117 to advance the supporting member 107 or the winding device 106 to the next zone.

The spaces between keys 110 are set l1, l2, l3 or l4 according to the zone. The same number of plants are arranged in each zone, and in order to broaden the spaces of the plants according to the growth thereof, the length of the zones is increased from zone A to zone D.

Moreover, the moving speeds in the respective zones, that is, the speeds of the driving chain in the respective zones, are changed so that a relation of V1<V2<V3 is established. Therefore, the spaces between the keys are changed according to the zone. In addition, the distance between the supporting member 107 and the winding device 106 is changed and the spaces between the pallets can be broadened as they are moved in the direction A.

In the foregoing embodiment, the driving chain having push keys is used as the moving device and the spaces between the pallets are changed by changing the spaces between the keys. There may be adopted a modification in which a screw type structure is used and the spaces between pallets are broadened by changing the screw pitch.

Moreover, the pallets may be advanced in the direction A without broadening the spaces between pallets.

In the foregoing embodiment, the wire is used as the flexible push member. A flexible linear member under tension, such as a chain or a metallic rope may be used instead of the above-mentioned wire.

As is apparent from the foregoing embodiment, the plant cultivating apparatus comprises pallet-guiding troughs expanded radially in the advance direction. A pair of moving devices are arranged on the both of the end portions of the rows of pallets which move the pallets in the advance direction. A flexible push member 105, is connected at one end to one of the moving devices, and at the other end to a winding device 106 which is connected to the other moving device. The winding device 106 houses the push member 105 so that when the pallets 102 are advanced in the A direction, the push member 105 unwinds. Accordingly, the respective pallets are moved while gradually expanding spaces between adjacent pallets. By virtue of this structural feature, the length of the push member for pushing and advancing the pallets on the advance direction can be changed in accordance with the length of the sets of pallets in the row direction, and no superfluous space is necessary so that the floor area can be effectively utilized.

FIG. 30 is a diagram illustrating still another embodiment of the plant cultivating apparatus of the present invention in which the consumption of electric power for illumination can be reduced.

Referring to FIG. 30, a cover 301 covering a growing chamber and sealing the chamber to prevent intrusion of light from the outside is composed of a heat-resistant material and has a white coating bonded to the inner surfaces thereof. Reference numeral 302 represents a space above a growing bed of the growing chamber. Reference numeral 303 represents a hydroponic tank filled with a hydroponic solution which is arranged in the lower portion of the growing chamber. Reference numeral 304 represents a light source in which the emission strength can be adjusted and reference numerals 305 represents plants to be cultivated which are set in the growing bed 306 on the hydroponic tank 303. A plurality of illuminance sensors 307 are arranged at predetermined points in the growing chamber to measure the spatial illuminance distribution in the growing chamber. Reference numeral 308 represents a device for processing the measured illuminance values, which is provided with a light controlling circuit for comparing the value measured by the illuminance sensor 307 with a preliminary set standard value and for controlling the power source of the light source based on the result of the previous comparison. Reference numeral 309 represents the power source of the light source 304.

Figure 31:
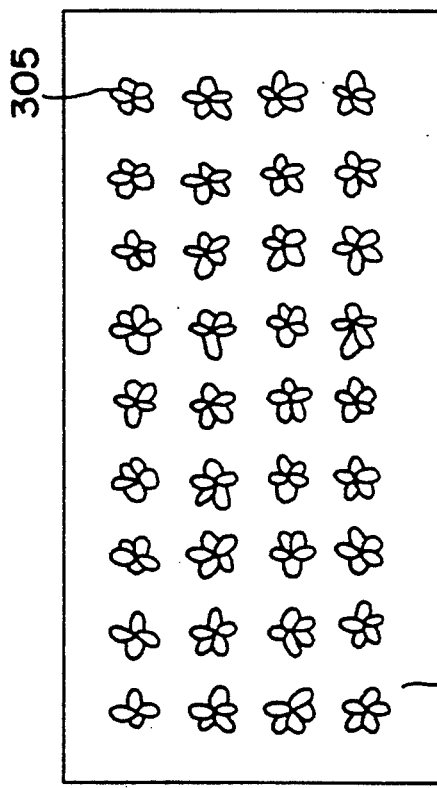
FIG. 31 is the top face of a cultivating bed.

Referring to FIG. 31, showing the top face of the bed 306, plants 305 are inserted into fixing holes of the growing bed 306, and the spaces between the plants 305 are slightly larger than the diameters of the plants on the plane at the time of harvesting.

In the present embodiment having the above-mentioned structure, the cultivation is started by setting seedlings of plants 305 having a weight of 3 to 10 g in the growing bed 306.

According to the kind of plants 305, the illuminance, temperature, humidity, carbon dioxide gas concentration, and air speed in the growing chamber and the composition and temperature of the hydroponic solution in the hydroponic tank 303 are set and controlled.

Under such controlled environmental conditions, the plants 305 grow at a high rate. At a certain light quantity, since the total weight of leaves of the plants 305 increases according to plant growth the reflection of light from the surface of the growing bed 306 is equivalently reduced, and, hence, the illuminance in the chamber is reduced. Moreover, since the inner surfaces of the growing chamber are covered with a white coating, the growth is greatly influenced by this reduction of the illuminance.

Although the illuminance is maintained at a minimum level necessary for growth at the time of planting the seedlings, the illuminance is gradually reduced in accordance with growth and growth is inhibited, as pointed out above. This disadvantage is eliminated in the following manner.

During cultivation, the illuminance in the growing chamber is always measured, for example, by an illuminance sensor 307 of the solar cell type, and the output thereof is fed into the device 308 for processing the measured illuminance values. In the processing device, the measured value is compared with the set of values of illuminance, and, when the measured value is smaller than the set value, a signal is output. At least two illuminance sensors 307 are arranged in the growing chamber, and one sensor is arranged to measure the illuminance on the floor surface and the other sensor is arranged to measure the illuminance of the wall surface. The output of the processing device 308 is put in the power source 309, which is a power source for the light sources 304 which are provided with a light controlling circuit so that the light is automatically controlled by the signal from the processing device 308.

When the above-mentioned light controlling means is used as the illuminance controlling means, the control can be performed precisely. However, this control can be accomplished very simply by just changing the number of lighted light sources 304.

Irrespective of the adopted means, since the spaces between the plants 305 are broad at the time of planting the seedlings and at the initial stage of cultivation, if the minimum optimum illuminance is set in this state, the illuminance would be insufficient in the latter stage. On the other hand, if the control is effected so that the minimum optimum illuminance is obtained in the latter stage, it is possible to prevent the illuminance from being excessive in the initial stage. Incidently, the set value of the illuminance used for the control is changed according to the kind of the plant to be cultivated and the leaf shape. Accordingly, this set value is determined in advance for each plant to be cultivated.

In the present embodiment, the plant cultivating apparatus is constructed so that a strong light does not intrude into the growing chamber from the outside, and the light-controllable light source, illuminance sensor and measured illuminance value processing device are arranged so that the illuminance in the growing chamber can be appropriately controlled. Accordingly, by controlling the light source to provide an appropriate illuminance in the initial stages of cultivation where spaces between plants are relatively broad, electric power waste through excessively high illuminance can be avoided, and when plants grow, the illuminance is controlled to a suitable level according to the state of growth. Accordingly, the growth of plants is appropriately fostered and cultivation is carried out economically. Therefore, there can be attained the effects of reducing the consumption of electric power for illumination and performing cultivation stable and deliberately based on an estimated growth speed in the plant cultivating apparatus of the present embodiment.

What is claimed is:

1. A plant cultivating apparatus comprising:
    a growing chamber;
    sets of pallets disposed in said growing chamber, each set comprising a plurality of pellets arranged in a row;
    means for supporting said sets of pallets and for moving each of said sets of pallets in a direction parallel to the row defined by the set of pallets while broadening the spaces between pallets including pallet-guiding troughs extending in a direction parallel to the sets of pallets,
    conveyor means for moving said pallets including a pair of moving devices arranged on first and second end portions of the rows of pallets to move said pallets along said troughs, a flexible push member having one end connected to one of the moving devices to move the sets of pallets along said troughs, and a winding device, wound in advance, connected to the other moving device to feed out the other end of the push member with the movement of the pallets.

2. A plant cultivating apparatus as set forth in claim 1 wherein each moving device comprises a plurality of driving chains connected to one another, said driving chains comprising a plurality of push keys connected to a supporting member for supporting the end of the push member, and speed changing means for changing the moving speeds of the respective driving chains in the direction of movement of the pallets so that the spaces between the pallets in the moving direction are broadened as the pallets advance.

3. A plant cultivating apparatus as set forth in claim 1, wherein the flexible push member is a wire.

4. A plant cultivating apparatus comprising:
    a plurality of growing chambers, each having a ceiling panel and peripheral walls;
    a hydroponic solution tank arranged in each growing chamber;
    sets of pallets in each chamber, each set comprising a plurality of pallets arranged in rows in the respective chamber and supported above said tank in the chamber so that plants placed in the pallets can take root in the solution in said tank;
    guide means in each chamber for guiding movement of the pallets in a direction essentially parallel to the rows;
    conveyor means for moving said pallets along said guide means from an initial growth location;
    artificial light sources for irradiating plants in said pallets in each chamber with light;
    reflecting surfaces on said ceiling and peripheral walls of each said growing chamber, said surfaces having a high light reflectance, said artificial light sources emitting light to irradiate the plants at a low illuminance, the ceiling panel being inclined so that the distance between the ceiling panel and the plants is closer in each chamber in the initial growth location;
    said hydroponic solution tank being constructed to that the depth of hydroponic solution is small under the initial growth location and large under a later growth location;
    said plurality of growing chambers being stacked vertically so that the moving direction of the sets of pallets is alternately reversed in successively higher ground chambers.

* * * * *

UNITED STATES PATENT AND TRADEMARK OFFICE
CERTIFICATE OF CORRECTION

PATENT NO. : 5,323,567
DATED : June 28, 1994
INVENTOR(S) : NAKAYAMA et al.

It is certified that error appears in the above-indentified patent and that said Letters Patent is hereby corrected as shown below:

Column 21, line 34, change "pellets" to --pallets--.

Signed and Sealed this

Twenty-second Day of November, 1994

Attest:

BRUCE LEHMAN

Attesting Officer

Commissioner of Patents and Trademarks